United States Patent [19]

Schroeder

[11] 4,163,387

[45] Aug. 7, 1979

[54] AIRCRAFT CABIN DISPLAY UNIT

[76] Inventor: Rondon L. Schroeder, 1717 S. Topeka, Wichita, Kans. 67211

[21] Appl. No.: 869,482

[22] Filed: Jan. 16, 1978

[51] Int. Cl.² .............................................. G01C 21/10
[52] U.S. Cl. ..................................... 73/178 R; 73/182; 364/443
[58] Field of Search ................ 364/424, 443, 433, 434, 364/556; 73/178 R, 182, 178 T, 181

[56] References Cited

U.S. PATENT DOCUMENTS 3,995,144   11/1976   Johnson et al. ...................... 364/421

Primary Examiner—Donald O. Woodiel

[57] ABSTRACT

A cabin display unit accepts information from a plurality of sources such as the petot static tube, a static air pressure source, a temperature source, cabin pressure source and the like and converts the data to corresponding electrical valves. The valves are multiplexed and converted to a digital value and applied to a microprocessor which calculates, from the data, the aircraft's true air speed, outside temperature, altitude, etc., and displays the calculated information on a cabin display unit.

4 Claims, 2 Drawing Figures

AIRCRAFT CABIN DISPLAY UNIT

BRIEF DESCRIPTION OF THE PRIOR ART

Devices for determining air speed are well known when the use is for the pilot so that he can properly operate the aircraft. Such devices are illustrated, for example, in the U.S. Patents issued to John Ims, U.S. Pat. No. 3,751,979, J. Parsons, U.S. Pat. No. 2,899,823, Edward J. Hazen, U.S. Pat. No. 3,735,635, Charles Daudt, Jr., U.S. Pat. No. 3,686,936 and I. U. Suits, et. al., U.S. Pat. No. 3,104,547. Devices combining more than one function are disclosed by a U.S. Pat. No. 2,959,958; however, none of the above patents disclose a display unit for cabin occupants which indicates true air speed, altitude, temperature, cabin pressure and other interesting data displayed by an unit in full view of the passengers. The information can also have the data base displayed in either metric or feet, and air speed in either knots or miles, etc.

BRIEF DESCRIPTION OF THE INVENTION

This invention features a micro-processing unit which accepts information from a pilot static tube which measures indicated air speed; a static pressure source, a temperature reference, and altitude information, for example, all information of which has been converted to corresponding electrical valves, and through a multiplexing unit sequentially samples the data, and inputs it in digital form to the input of the micro-processing unit. The input information, after appropriate calculation, determines the true air speed, altitude, outside temperature and other information which in turn, is applied to the cabin display unit for the information of the passengers.

DETAILED DESCRIPTION OF THE INVENTION

Figure 1:
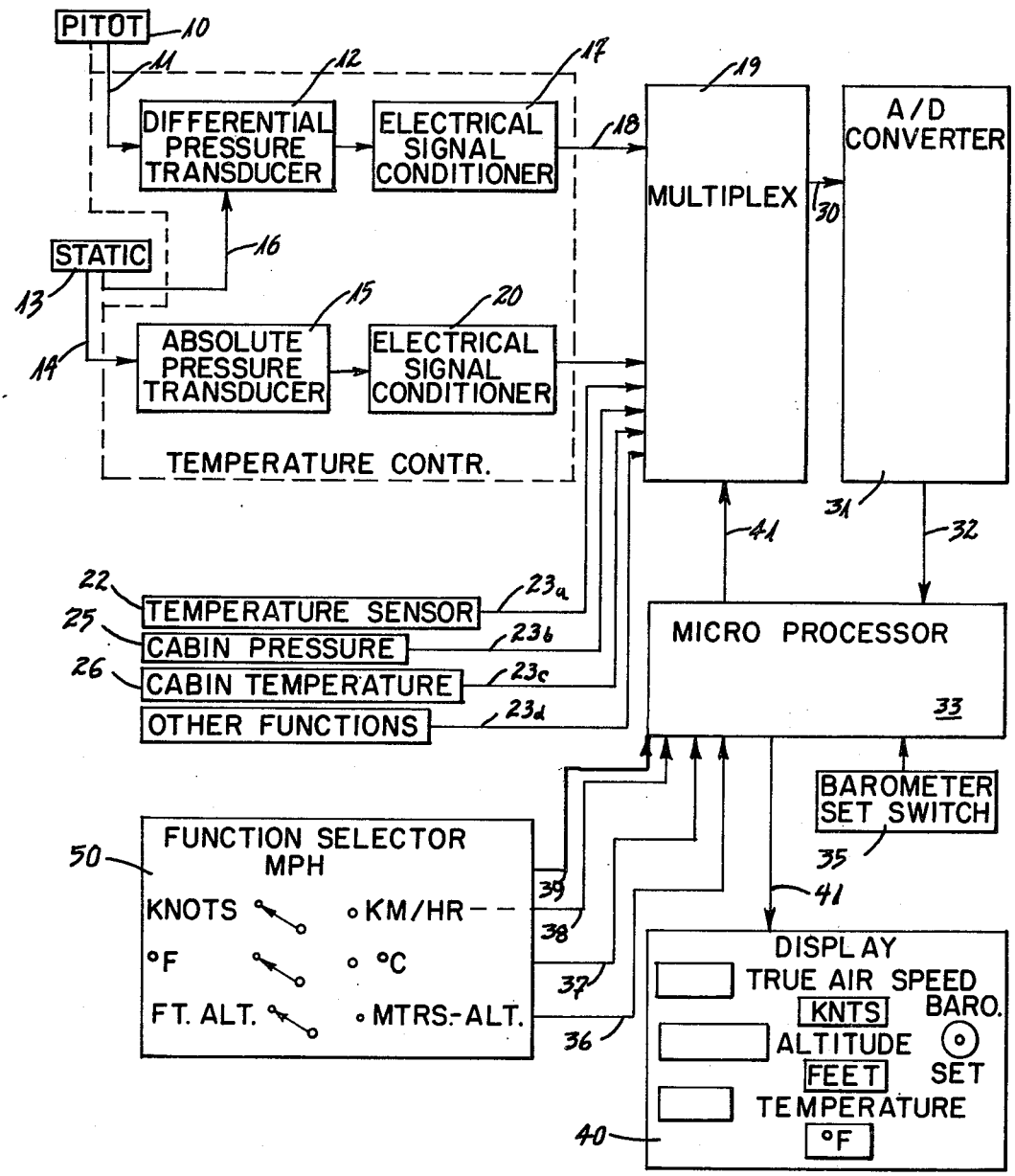
FIG. 1 is a block diagram of the electrical and mechanical circuitry, necessary to generate the required information for the cabin display unit.

Referring to the Figures in general but in particular to FIG. 1. A pitot tube 10 is connected by means of a tube 11 to a differential pressure transducer 12. A static input 13 is connected through a means 14 to the input of an absolute pressure transducer 15 and to the input 16 of differential pressure transducer 12. The output of differential transducer 12 is connected to an electrical signal conditioner means 17, which has it output connected through a wire 18 to the signal input of a multiplexing unit 19. Static pressure transducer 15 has its output connected through a signal conditioner 20 which applies its output electrical signal through wire 21 to another signal input of multiplexer 19.

Other needed information such as outside temperature from a temperature sensor 22 is applied from its output through a wire 23 to a signal input of multiplexer 19. Additional data from sensors such as a cabin pressure sensor 25, a cabin temperature sensor 26 may also be applied to a signal input of multiplexer 19. The sequenced data from the multiplexer 19 inputs is applied through means 30 to an analog to digital (A/D) converter 31 which has its output means 32 connected to a data input of a micro-processor 33.

Many altitude devices which provide a digital read out system provide a means 35 for "setting" the altitude information when the system is initially energized since the altitude read out apparatus does not include a permanent memory as to its previous altitude after the aircrafts is shut down from the previous flight. The barometric set switch 35 enters the proper altitude at the beginning of the flight. The information from the barometric set switch 35 is applied to a function input of the micro-processor. In addition to the altitude data, information for determining the display function unit is provided to the signal function input along wires 35, 36, 37, 38 and 39 to micro-processor 33.

In order to properly input data for A/D converter 31, the multiplexing unit must be controlled by the micro-processor 33. Sweep data from micro-processor 33 is applied through a line 41 to multiplexer 19 for determining which input samples are needed to the input means of micro-processor 33.

Output for the micro-processor 33 is applied to display unit 40 through wire 41a through 41e.

OPERATION

The micro-processor 33 receives data from the altimeter, the differential pressure transducer 12, the static pressure transducer 15 and temperature transducer 32 to determine the true air speed of the aircraft. After processing the data, the micro-processor 33 applies the processed data to the display unit. Other information such as the cabin pressure, outside temperature, altitude, etc., is applied to the micro-processor through the function input. After approximate processing, the micro-processor applies the data in electrical form to the display unit in the cabin. At the same time, the microprocessor is properly resequencing the multiplexer 19 to obtain updated data on a continuing basis as the aircraft proceeds on its course.

In order to provide a display in the proper units (feet, meters, miles, etc.) a function selector switch 50 is provided which instructs the micro-processor 33 as to the desired display (from miles to knots, i.e.) which then generates a corresponding output to the display unit.

Figure 2:
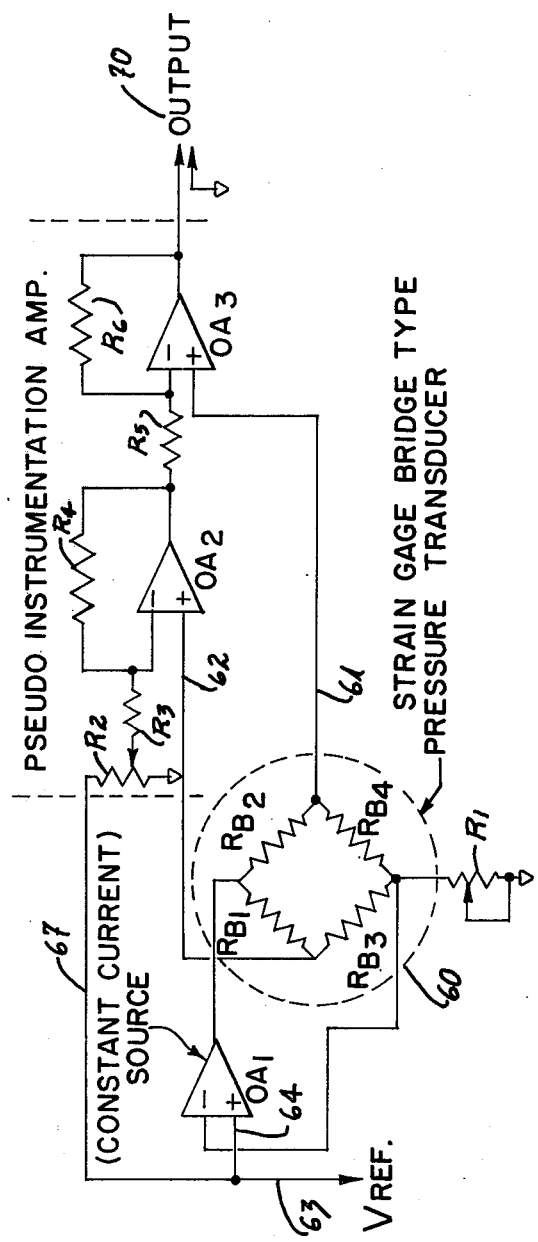
FIG. 2 is an electrical schematic of a electrical conversion unit from a mechanical input such as premise to a electrical output corresponding to the magnitude of the input.

Referring to FIG. 2 a circuit diagram shows an electrical schematic for converting from a mechanical input such as pressure to a corresponding voltage output. A transducer enclosed in dotted line 60 comprises a strain gage type bridge composed of resistors RB-1 through RB-4. One (or two) of the legs of the bridge accept information from the pressure source and applies it to one side of the bridge which can be mounted on a diaphram, for example. An increase in pressure at the pressure transducer will cause a corresponding distortion of the strain gage diaphram and hence a change in resistance of the strain gage resistor mounted on the diaphram as for example RB-2. When this occurs the bridge becomes unbalanced. A constant current source including operational amplifier OA-1 provides a controlled current and to bridge 60.

An unbalance of any resistor in bridge 60 will cause a variation in resistance of one leg of the bridge which in turn reflected is a voltage being generated in lines 61 and 62 to operational amplifiers OA-2 and OA-3 respectively. Resistors R-2 provides through R-3 an input to OA-2. R-4 and R-6 provide for gain adjustments on OA-2 and OA-3 respectively. R-2 adjusts to offset a "zero" voltage to OA-2 while R-1 adjusts the gain of the operational amplifiers to calibrator for variations in different transducers. A reference voltage $V_{ref}$ is provided along wire 63 through wire 64 to operational amplifier OA-1. $V_{ref}$ is also supplied to resistor R-2 through wire 67.

The above described circuit will provide an output at 70 corresponding to a change in pressure which was applied to bridge 60.

CONCLUSIONS

In the particular embodiment disclosed, to voltage pressure transducers have been used. It is obvious that other types of transducers could be employed, for example, those that change pressure to a variation in resistance, frequency, or into some other electrical value, and still be within the spirit and scope of this invention. Other inputs can also be inputed to the micro-processor.

Modification of variator in the particular embodiment of the invention disclosed can be made and still be within the spirit and scope of the invention as claimed.

What I claim is:

1. A cabin display unit for an aircraft having a pitot tube output and a static air pressure source;
  a. a cabin display unit having first and second inputs,
  b. a differential pressure transducer having said first input connected to said pitot tube output and a second input connected to said static air pressure source;
  c. an absolute pressure transducer have an input connected to said static air pressure source;
  d. a multiplexing means having a plurality of signal inputs, a command input and an output;
  e. a first electrical signal conditioner having its input connected to the output of said differential pressure transducer, and its output connected to a signal input of said multiplexing means;
  f. a second electrical signal conditioner having its input connected to an output of said absolute pressure tranducer, and its output connected to a second signal input of said multiplexing means;
  g. an analog to digital converter means having its input connected to the output of said multiplexing means;
  h. a micro-processing unit means having its input connected to an output of said analog to digital converter means and its output connected to said cabin display unit, and having a plurality of function selector inputs and a command output connected to a command input of said multiplexing means, and;
  i. function selector means coupled to the inputs of said micro-processing unit for determining the particular mode of display of said display units of the air speed, temperature, and altitude of said aircraft: whereby information from said pitot static tube, and statice pressure source and said temperature and altimeter, when electrically processed and applied to said micro-processing unit will have the true air speed calculated along with the altitude, temperature and other functions calculated and displayed on said cabin display unit.

2. A cabin display unit as described in claim 1 including a cain pressure transducer having its output connected to an input of said multiplexing means and a read out on said cabin display unit indicating said cabin pressure.

3. A cabin display unit as described in claim 1 including a barometric set means having its output connected to a function input of said micro-processing unit whereby altitude information can be entered into said micro-processing unit so that said micro-processing unit will properly indicate altitude changes from said entered altitude information.

4. A cabin display unit as described in claims 1, 2, or 3, including means in said micro-processing unit for determining the base of the display whereby either the metric, knotical or English units can be calculated and displayed on the said cabin display unit.

* * * * *